Figure 1:
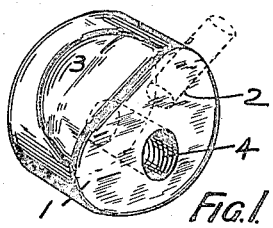

Nov. 13, 1923.

E. A. BRADSHAW ET AL 1,474,139

DEVICE FOR LOCKING DEMOUNTABLE TIRE CARRYING RIMS TO ROAD VEHICLES, ETC

Filed April 6, 1920

INVENTORS
ERNEST ALFRED BRADSHAW
CECIL WILLIAM SIM BLACK
ARTHUR PERCIVAL NICHOLLS

BY
THEIR ATTORNEY

Patented Nov. 13, 1923.

1,474,139

UNITED STATES PATENT OFFICE.

ERNEST ALFRED BRADSHAW, CECIL WILLIAM SIM BLACK, AND ARTHUR PERCIVAL NICHOLLS, OF NORTH SYDNEY, NEW SOUTH WALES, AUSTRALIA.

DEVICE FOR LOCKING DEMOUNTABLE TIRE-CARRYING RIMS TO ROAD VEHICLES, ETC.

Application filed April 6, 1920. Serial No. 371,586.

*To all whom it may concern:*

Be it known that ERNEST ALFRED BRADSHAW, whose post-office address is 52 Walker Street, North Sydney, New South Wales, Australia, and CECIL WILLIAM SIM BLACK and ARTHUR PERCIVAL NICHOLLS, whose post-office address is 28 Junction Street, North Sydney, aforesaid, all subjects of the King of Great Britain and Ireland, and residents of North Sydney, New South Wales, Australia, have invented certain new and useful devices for locking demountable tire-carrying rims to road-vehicle wheels or bracket supports or for locking spare wheels provided with such rims to bracket supports, of which the following is a specification.

This invention relates to a device for locking demountable tire carrying rims to the felloes of road vehicle wheels or for locking spare wheels provided with such rims or spare rims carrying tires to brackets which are adapted to be secured to a motor or other vehicle.

The said device consists essentially of a locking nut provided with a tapped opening and an abutment shoulder the latter being adapted to bear against one side of a demountable rim when the nut is in locked position. The said opening is disposed in the nut excentrically in relation to its perimeter, and the said shoulder is formed on the nut by making one portion of one of its sides of lesser thickness than the other portion of such side. The nut is adapted to be secured to a bolt threaded through the felloe of a road vehicle wheel carrying a demountable rim, or to the threaded stem of a bracket capable of being inserted through lugs on a ring upon which a demountable tire carrying rim is carried or through a bolt-hole opening in a spare wheel carrying a demountable rim, or to bolts threaded through openings in lugs on a ring carried on brackets, said ring being adapted to have mounted on it a spare demountable tire carrying rim. The said brackets are intended to be affixed to a road vehicle. The shoulder formed on the nut is so shaped that when the nut is in locked position either on said bolts or brackets it will be adapted to prevent side slipping of the rim and creeping of it around either the felloe of the wheel or the ring support to which it is attached.

A tommy hole or holes may be provided in the side or sides of the nut to enable a tommy pin to be inserted therein to permit turning of the nut on the said bolts or bracket stems, or the nuts may be formed to permit them to be turned by a spanner or other suitable device. The nuts are preferably constructed circular in shape but they may be constructed to any other preferred shape.

In the application of the invention in attaching demountable tire carrying rims to the felloe of a vehicle wheel a series of openings are provided in the felloe and surrounding same through which bolts may be threaded. Both ends of the bolt may be screw-threaded or one of its ends may have a head and its other end screw-threaded. If a bolt with a head is utilized it is threaded through one of the openings in the felloe and such head may abut a plate having its upper end bent so that one side of the demountable rim may bear against it; on the other end of the bolt a lock nut as herein described is mounted by screwing the end of the bolt into its tapped opening. The nut is turned on the bolt until its shoulder rests against the opposite side of the rim. When a bolt having its opposite ends screw-threaded is used, locking nuts constructed in accordance with the invention may be mounted on both ends of the bolt and turned thereon until the shoulders thereof abut the opposite sides of the rim.

If spare wheels provided with demountable tire carrying rims are to be detachably affixed to brackets, capable of being secured to the rear or other suitable part of a vehicle, the brackets may consist of a pair of arms having their outer ends screw-threaded. These arms are each provided with a horn piece adapted to abut one side of the demountable rim when the arms have been threaded through bolt-hole openings in the felloe of the wheel to which the rim is attached. On the threaded ends of the bracket locking nuts as above described are mounted and are turned on such ends until their shoulders abut the opposite side of the rim to that with which the horn-piece contacts.

The invention is also capable of application in securing demountable tire carrying rims to rings or hoops, the latter being attached by brackets to a motor or other vehicle. The rings or hoops carry the rims around them and they may be fitted with lugs having bolt openings in them. The brackets may have one or more arms which are screw-threaded at their outer ends and adapted to be inserted through the openings in the lugs. Nuts constructed in accordance with the invention are attached to the threaded ends of the brackets and turned thereon until their shoulders abut one side of the rim. The other side of the rim abuts a horn-piece on each of the bracket arms. The rings may, however, be fitted with lugs provided with bolt openings therein through which bolts may be threaded and upon their threaded ends locking nuts herein mentioned may be mounted and secured as before described. In such construction, the brackets are attached directly to the rings at one end and to a suitable part of a vehicle at the other end, and the rings may be furnished with a horn piece at one side against which one side of the tire carrying rim may bear.

Figure 2:
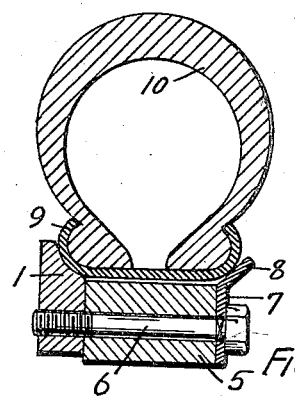
Figure 3:
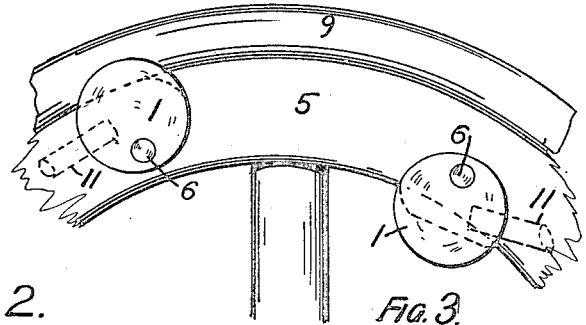
Figure 4:
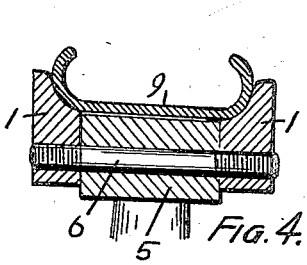
Figure 5:
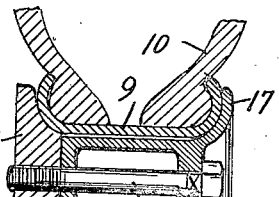
Figures 6, 7:
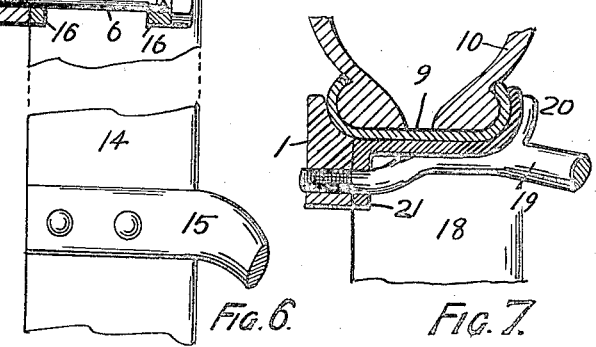

In the accompanying drawings Fig. 1 is a perspective view of the locking nut with tommy pin inserted into an opening in one of its sides; Fig. 2 is a sectional view illustrating a detachable rim carrying a tire secured to the felloe of a road vehicle by means of locking nut herein described; Fig. 3 is a front view of a wheel carrying a demountable rim with tire thereon showing the locking nut in locked and unlocked position; Fig. 4 is a sectional view corresponding with Fig. 2 but with tire omitted and two locking nuts mounted on the opposite ends of a bolt threaded through the wheel felloe; Fig. 5 is a sectional view showing the locking nut attached to a bracket upon which a spare wheel carrying a detachable rim is mounted; Fig. 6 is a view illustrating a bracket supporting ring for a detachable tire carrying rim, said ring having lugs secured to it to which bolts may be attached and upon which locking nuts may be mounted; and Fig. 7 is a view corresponding with Fig. 6 but showing a locking nut attached to the end of the bracket stem.

The locking nut 1 is made of metal and is preferably constructed circular in shape with a tommy hole 2 in one of its sides. The nut may, however, be constructed to any preferred shape and if desired it may be provided with two or more tommy holes disposed in its sides or it may be formed in such manner that it may be turned by a wrench or spanner or like contrivance. Portion of one side of the nut 1 is of less thickness than the other portion of such side and the former portion 3 is shaped to adapt it to act as a shoulder to bear against one side of a demountable tire carrying rim when the nut is in locked position to prevent side slipping of the rim and creeping of same around its support. Excentrically disposed in the nut in relation to its perimeter is the tapped opening 4.

If the nut is to be used for securing demountable rims to the felloe of a vehicle wheel, the felloe 5 (Fig. 2) may be furnished with a number of openings surrounding it through which bolts 6 may be threaded. Plates 7 are secured to the felloe against which the heads of the bolts abut and these plates have one of their ends 8 formed to bear against one side of the demountable rim 9 carrying the tire 10. Lock nuts 1 are mounted on the other ends of the bolts 6 and turned thereon until their shoulders abut the opposite side of the rim 9. The tommy pin 11 may be used for turning the nuts 1 if holes are provided in the latter for the insertion of the end of the tommy pin. In Fig. 5 the plates 7 are dispensed with and the bolts 6 have their opposite ends screw-threaded and nuts 1 are mounted on such ends and turned thereon until the shoulders of opposite nuts abut the opposite sides of the rim 9.

Referring to Fig. 5, the bracket arm 12 is threaded at one end and it is also provided with a horn piece 13 adapted to bear against one side of the rim 9. A series of openings are provided in the felloe 5 and surrounding same and the arms 12 are threaded through these openings. Mounted on the screw-threaded ends of the arms 12 are nuts 1 which are turned thereon until their shoulders abut one side of the rim 9. The brackets are adapted to be secured to the rear or other portion of a motor or other vehicle and to carry spare wheels with tire carrying rims mounted thereon in the manner described.

With reference to Fig. 6 which illustrates a bracket ring support for a spare demountable tire carrying rim, the ring 14 is adapted to be secured to a convenient part of a motor or other vehicle by means of the brackets 15. Such rings have two or more pairs of lugs 16 fitted thereto and these lugs are furnished with openings through which bolts 6 may be threaded. Nuts 1 are mounted on the threaded ends of the bolts; the ring 14 may be formed with a horn piece 17 to bear against one side of the rim 9. When the nuts are turned into locked position on the bolts their shoulders abut the side of the rim 9 opposite to that which contacts with the horn piece 17 on the ring 14.

The bracket ring support illustrated in Fig. 7 differs from that shown in Fig. 6. Such support consists of a ring 18 which is adapted to be secured to a motor or other vehicle by means of the bracket 19. The bracket 19 is screw-threaded at one end and it is provided with a horn-piece 20 adapted to abut one side of the rim 9. Nuts 1 are mounted on the threaded portion of the bracket and when in locked position thereon their shoulders abut the opposite side of the rim 9. The ring 18 is fitted with holed lugs 21 which form abutments for the nuts 1 and through which the screw-threaded ends of the bracket 19 may be passed.

What we claim as our invention and desire to secure by Letters Patent is:—

In a device for locking tire rims in place, a holding member having a screw threaded portion thereon, an integral horn piece projecting from said holding member and adapted to engage one edge of the tire rim, a circular nut having an eccentrically located opening to engage the threaded portion of said member, said nut having a hollowed out portion diametrically opposite the opening and adapted to engage the edge of the tire to cooperate with the horn in holding the rim in place.

In witness whereof we have affixed our signatures.

ERNEST ALFRED BRADSHAW.
CECIL WILLIAM SIM BLACK.
ARTHUR PERCIVAL NICHOLLS.